No. 780,926.                                              Patented January 24, 1905.

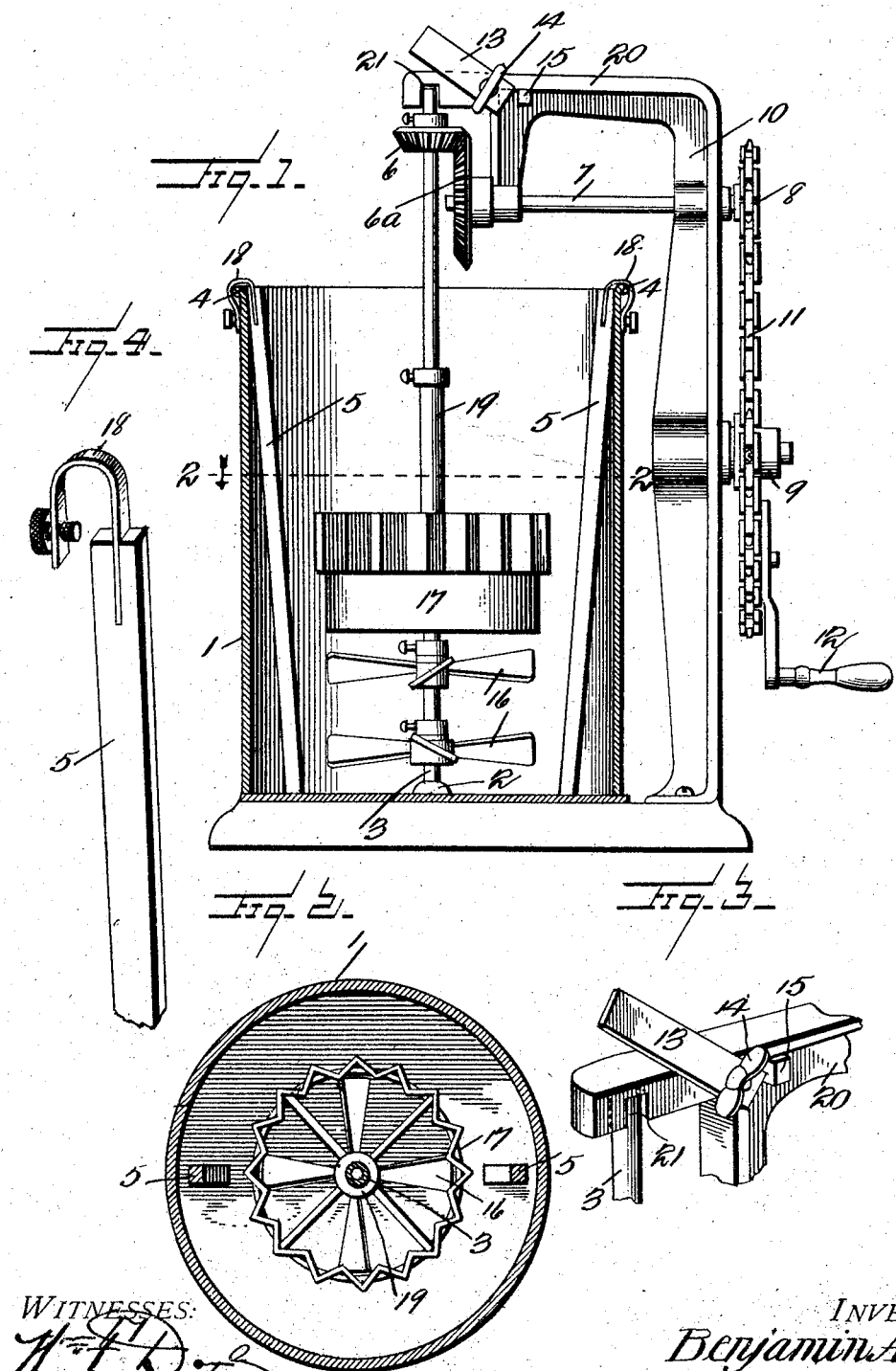

UNITED STATES PATENT OFFICE.

BENJAMIN A. WELDS, OF JACKSON, MICHIGAN.

CHURN.

SPECIFICATION forming part of Letters Patent No. 780,926, dated January 24, 1905.

Application filed March 30, 1903. Serial No. 150,226.

*To all whom it may concern:*

Be it known that I, BENJAMIN A. WELDS, a citizen of the United States, residing at the city of Jackson, in the county of Jackson and State of Michigan, have invented certain new and useful Improvements in Churns, of which the following is a specification.

My invention relates to improvements in churns in which the cream to be churned is placed in a receptacle and is churned by rotating therein the dasher.

The objects and advantages of my improvements are, first, to provide a dasher that is adjustable, according to the amount of cream to be churned; second, to provide a dasher having two or more propellers thereon to more quickly and properly churn the cream when there is a large quantity; third, to provide a dasher having right-hand and left-hand propellers arranged alternately upon the same shaft to more perfectly agitate the said cream; fourth, to provide breaks detachably mounted in said receptacle to facilitate the cleaning of the breaks and receptacle; fifth, to provide breaks set at an angle in the direction from which the current strikes them and to provide a space between the breaks and the sides of the receptacle to more perfectly break up the revolving current and throw it over into the vortex of the churn; sixth, to provide a circular band near the surface of the cream having a crimped outer surface to facilitate the agitation of said cream and separation of the butter therefrom, other objects and advantages being apparent from the following description.

In the drawings forming part of this specification, Figure 1 is a side elevation illustrating the churn-body or receptacle in vertical section, disclosing the parts arranged therewithin. Fig. 2 is a horizontal section on the line 2 2 of Fig. 1. Fig. 3 is a fragmentary view illustrating the manner in which the upper end of the dasher-shaft may be secured against accidental displacement, and Fig. 4 is a detail view illustrating the upper portion of one of the breakers.

In the drawings forming part of this said specification, and in which like numerals of reference refer to similar parts, the receptacle provided to hold the cream to be churned is indicated by the numeral 1. At the bottom of said receptacle it is provided with a socket 2, which forms a journal for the lower end of the dasher-shaft 3. For the upper end of the dasher-shaft a journal is provided in the arm 20 of the frame 10. To facilitate the insertion and removal of said shaft 3 therefrom, the said journal is provided with an opening upon one side, as 21, and this is covered by the latch 13, resting upon the projection 15 on said arm 20, and the said latch is provided with a thumb-screw 14, by means of which it may be held firmly in place or loosened, as desired. The said dasher-shaft is provided at its lower end with two or more propellers 16, and of these one has right-hand blades and the second has left-hand blades. When a larger quantity of cream is to be churned, more propellers 16 may be employed, and I prefer to arrange them alternately, first a right-hand propeller and next a left-hand propeller, as by this means the blades of the propellers agitate the cream to a higher degree and force more air thereinto. These said propellers 16 are adjustably attached to said dasher-shaft 3 and may be raised or lowered, as desired, for more perfectly and quickly churning said cream and may be removed entirely from said shaft when desired to clean them more perfectly. Above the said propellers and also adjustably attached to said dasher-shaft I have provided a circular band 17, attached to the tube 19, adapted to slide up and down upon said shaft 3. The object of this said band is to provide a funnel at the middle of the receptacle down which the cream and air may be drawn by the propellers and to partially separate the cream being drawn downward from the current set in motion in a circular direction by the rotation of said propellers. The outer surface of this said band 17 is provided with a crimped conformation to further assist in agitating the said cream, it being apparent that this crimped surface will agitate and churn the cream more than a piece of smooth metal. Between the said band 17 and the outer side of the receptacle I have provided the detachable breaks 5 5. These breaks are of a less width than the distance between the band 17 and the side of the receptacle, that the current of cream revolving in said receptacle may pass upon both sides thereof, and are of a sufficient length that when the loops 18 at their upper ends are engaged with the ears 4 4 upon the receptacle the lower ends will contact with the bottom of the receptacle at a sufficient distance ahead of the perpendicular to retain them at an angle, as shown, with the lower end in the direction from which the revolving stream of cream approaches. To revolve the said dasher-shaft and dashers within said receptacle, I have provided said dasher-shaft with a bevel-gear 6 at its upper end, which is in mesh with the bevel gear-wheel 6ª, mounted upon the horizontal shaft 7, mounted in suitable bearings in the frame 10. At the right-hand end of this shaft 7 I have provided a sprocket-wheel 8, with a chain 11 connecting it with the second sprocket-wheel 9, mounted in suitable bearing in the frame 10. On this said sprocket-wheel 9 I have provided the handle 12, to be employed in revolving said wheel. By this means whenever it is desired to operate the said churn the said sprocket-wheel 9 is revolved by means of said handle 12, and this in turn revolves the sprocket-wheel 8, the shaft 7, to which it is attached, the bevel gear-wheel 6ª, mounted thereon, the bevel gear-wheel 6, mounted upon the dasher-shaft in mesh therewith, and the dashers and band attached to said dasher-shaft 3. If it is desired, the said dasher-shaft may be revolved by any other suitable means without departing from the spirit of my said invention.

I find that in the operation of my said machine the right and left dashers agitate the cream much more than one would do or than several right-hand or left-hand dashers would accomplish, that the breaks by being set at the angle shown assist in throwing the cream over into the vortex of the whirlpool in addition to breaking up the circular current set in motion by the dashers, and that by adjusting the breaks so that the cream may pass upon both sides thereof the cream is broken up more and the butter-globules are separated therefrom more perfectly and quickly. I also find that the crimped band at the middle assists in agitating the cream, and thus aids in separating the butter, and that it assists in breaking up the cream and in introducing the air thereinto as the cream is being drawn downward therethrough by the dashers below. In addition to this it provides a receptacle through which all of the cream is passed and gradually collects the butter as rapidly as it is separated from the said cream.

Having thus described my said invention, what I claim, and desire to secure by Letters Patent, is the following:

In a churn, the combination with a base, of an upright rising therefrom, an arm extending horizontally from the upright, said arm having an opening in its free end, a churn-body arranged upon the base, a shaft journaled within said body and the opening in the free end of the arm, a latch mounted upon the arm and arranged for vertical swinging movement to coöperate with the said opening to lock the upper end of the shaft in position, means mounted upon said arm forming a rest for the support of said latch when in inoperative position, dashers arranged directly upon the lower end of the shaft, a sleeve adjustably mounted upon the shaft above the dashers, an aerating-band carried by the said sleeve, the upper part of the band being crimped at intervals to form an exterior and interior corrugated surface, breakers detachably mounted within the churn-body and spaced from the interior thereof from the bottom to a point above the upper edge of the aerating-band, whereby the contents of the body may pass entirely therearound, and means for rotating the shaft.

BENJAMIN A. WELDS.

Witnesses:
CHESTER W. BROWN,
GEO. J. GENEBACH.